UNITED STATES PATENT OFFICE.

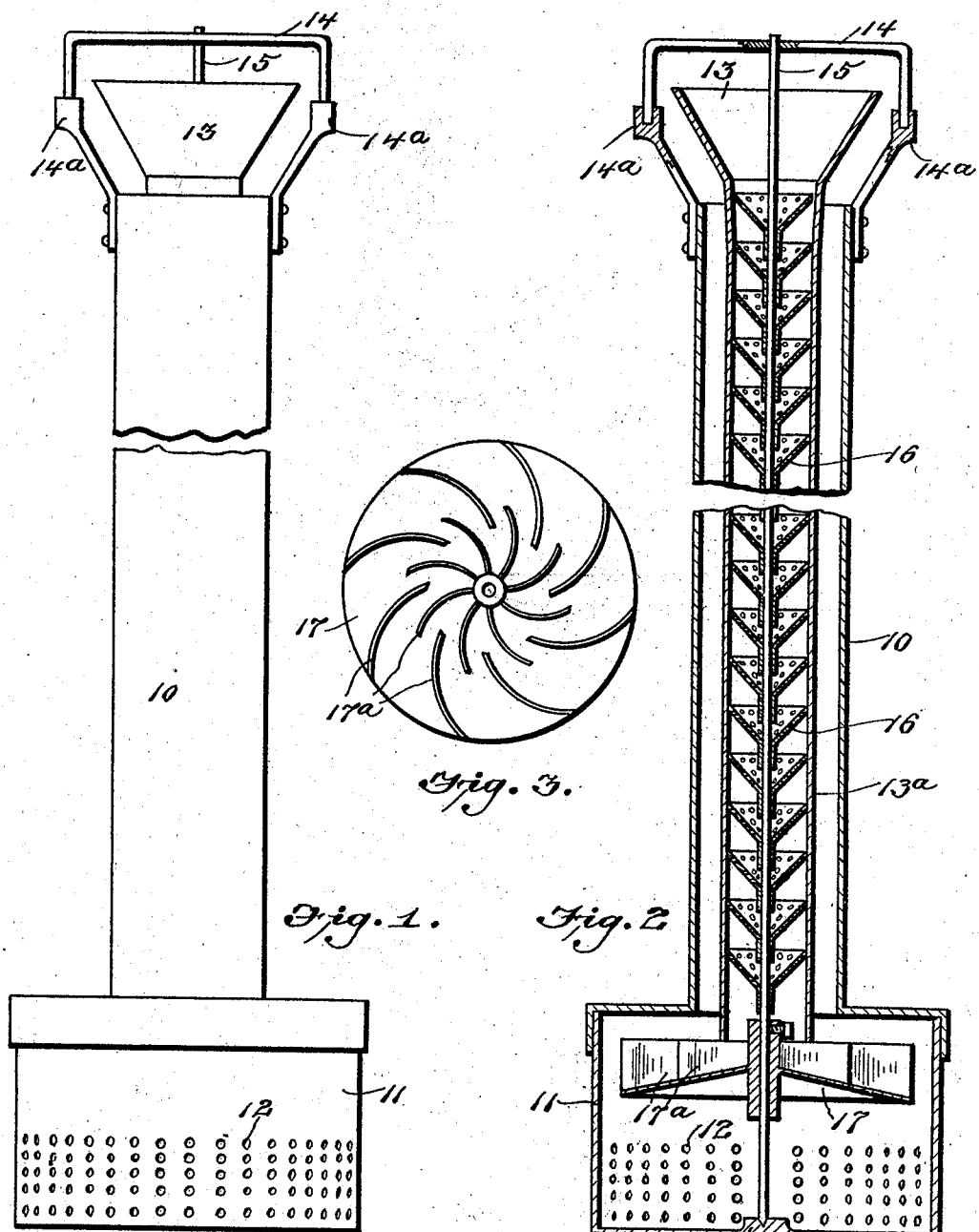

CHARLES WALKER, OF CHICAGO, ILLINOIS.

CREAM-SEPARATOR.

No. 815,239.　　　　　Specification of Letters Patent.　　Patented March 13, 1906.

Application filed July 31, 1905. Serial No. 271,993.

*To all whom it may concern:*

Be it known that I, CHARLES WALKER, a citizen of the United States, residing at Chicago, in the county of Cook and State of Illinois, have invented new and useful Improvements in Cream-Separators, of which the following is a specification.

This invention is a cream-separator provided with devices for disintegrating the globules in the milk, so that the cream will afterward readily and quickly separate from the milk.

Said devices consist of a series of rotary strainers through which the milk flows, the rotary action being imparted by the flow of the milk.

In the accompanying drawings, Figure 1 is a side elevation of the device. Fig. 2 is a central vertical section. Fig. 3 is a detail in plan of the turbine-wheel.

Referring specifically to the drawings, 10 indicates an outer cylindrical casing having in its bottom an enlarged chamber 11, the lower part of the side walls of which is perforated, as at 12. Mounted within the casing is a tube 13$^a$, enlarged to form a funnel 13 at the top, and this tube is rotatable with and upon a spindle 15, stepped into a bearing 15$^a$ on the bottom of the chamber 11 and finding a bearing at the top in a removable cross-bar 14, the downturned ends of which fit in sockets 14$^a$, formed at the top of the casing 10. Fitting within the tube 13$^a$ are a series of funnel-shaped strainers 16, which are sleeved over the spindle 15 and fit snugly within the tube. At the bottom of the tube and located to rotate within the chamber 11 is a turbine-wheel 17, having a series of curved upwardly-projecting blades 17$^a$. This wheel drives the spindle and receives the flow of milk from the tube 13$^a$. The bottom of the web of the wheel 17 is inclined or conical, so that the milk will flow to the outer edge thereof and by its contact with the blades will drive the wheel.

In use the milk is poured into the funnel 13 and flows down the tube 13$^a$ and through the strainers 16. The flow drives the wheel which rotates the spindle and the strainers, and thereby acts to agitate and disintegrate the globules in the milk, which finally flows out through the strainer 12 in such condition that the cream will quickly rise to the top of the milk.

It will be understood that the device is placed within the pan or tub in which the milk is to be set for the cream to rise, and after the desired amount of milk is poured in the device is removed.

What I claim as new, and desire to secure by Letters Patent, is—

1. A cream-separator comprising a tube through which the milk is poured, and having therein a series of rotating strainers.

2. A cream-separator comprising a tube, a turbine-wheel at the bottom thereof, driven by milk which flows through the tube, and a series of rotating strainers in the tube, connected to and driven by the wheel.

3. A cream-separator comprising a tube through which the milk is poured, and having a series of funnel-shaped rotating strainers therein.

4. A cream-separator comprising a spindle, a tube mounted thereon and having a turbine-wheel at the bottom which drives the spindle by the flow of milk through the tube, and a series of strainers secured upon the spindle, and fitting within the tube.

5. A cream-separator comprising an outer cylindrical casing having at the bottom an enlarged chamber with perforated walls, a tube rotatably mounted within said casing and having at the bottom a turbine in said chamber, driven by the flow of milk through the tube, and a series of strainers in said tube.

In testimony whereof I have signed my name to this specification in the presence of two subscribing witnesses.

CHARLES WALKER.

Witnesses:
　SIGNA FELTSKOG,
　H. G. BATCHELOR.